United States Patent
Sachs (10) Patent No.: US 8,188,970 B2
(45) Date of Patent: May 29, 2012

(54) SYSTEM AND METHOD FOR AUTOMATIC RE-CALULATION AND MONITORING OF THRESHOLDS IN A PUCK-BASED POINTING DEVICE

(75) Inventor: Todd S. Sachs, Palo Alto, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 901 days.

(21) Appl. No.: 11/506,244

(22) Filed: Aug. 17, 2006

(65) Prior Publication Data

US 2008/0042971 A1 Feb. 21, 2008

(51) Int. Cl.
*G06F 3/033* (2006.01)

(52) U.S. Cl. ........................................ 345/157; 345/156

(58) Field of Classification Search ........... 345/156–167
See application file for complete search history.

(56) References Cited

U.S. PATENT DOCUMENTS

| | | | |
|---|---|---|---|
| 4,908,791 A * | 3/1990 | Giorgio | 345/167 |
| 5,160,918 A * | 11/1992 | Saposnik et al. | 345/161 |
| 7,193,609 B2 * | 3/2007 | Lira | 345/157 |
| 2005/0110747 A1 | 5/2005 | Harley et al. | |
| 2005/0110754 A1 | 5/2005 | Harley et al. | |
| 2005/0110755 A1 * | 5/2005 | Harley et al. | 345/160 |
| 2005/0110769 A1 * | 5/2005 | DaCosta et al. | 345/173 |
| 2006/0022937 A1 | 2/2006 | Matta et al. | |
| 2006/0044260 A1 | 3/2006 | Harley et al. | |
| 2006/0055667 A1 | 3/2006 | Matta et al. | |
| 2006/0139323 A1 | 6/2006 | Harley et al. | |

* cited by examiner

*Primary Examiner* — Alexander Eisen
*Assistant Examiner* — Cory Almeida (57) ABSTRACT

A pointing device system includes a moveable puck, a first surface on which a puck field of motion is defined, a controller, and a pressure-sensing mechanism. The pressure sensing mechanism measures an amount of pressure applied to the puck. The controller determines whether the measured amount of pressure meets a touch threshold value or a click threshold value. The touch threshold value is re-calculated when the measured amount of pressure meets or exceeds the previous touch threshold value but does not meet the click threshold value. The click threshold value is re-calculated when the measured amount of pressure meets the previous click threshold value. Changes in a position of the puck or a review of previously measured pressure values or events may also be analyzed prior to re-calculating the touch or click threshold values.

20 Claims, 10 Drawing Sheets

SYSTEM AND METHOD FOR AUTOMATIC RE-CALULATION AND MONITORING OF THRESHOLDS IN A PUCK-BASED POINTING DEVICE

BACKGROUND

Modern operating systems and application programs for data processing devices such as, for example, computers, cell phones, gaming systems, digital video recorders, and personal digital assistants, require a pointing device for controlling the position of a cursor on a display. For computers, one successful pointing device is the "mouse". A mouse is a handheld object that is moved over a flat surface to control the motion of a cursor on the display. The direction and distance over which the mouse is moved determines the direction and distance the cursor moves on the display. A conventional mouse provides a rigid object that a user can move with great precision.

While the mouse has provided a satisfactory solution to the pointing device problem in the desktop computer market, a similarly successful device is not available for portable and handheld devices. The Synaptics capacitive TouchPad™ and the IBM TrackPoint™ are examples of pointing devices currently used with portable and handheld devices. The TrackPoint™ is a small button typically placed in the center of a laptop computer keyboard. The button is moved in a manner analogous to a "joystick" by applying a lateral force to the top of the button with a finger.

The TouchPad™ is a blank pad, typically rectangular in shape that is placed in front of the keyboard on most laptop computers. The device senses the position of a finger on the surface of the rectangular pad relative to the edges of the pad by measuring the capacitance changes introduced by the finger on a series of electrodes beneath an insulating, low-friction material.

Unfortunately, both the TouchPad™ and the TrackPoint™ suffer from a lack of precision. The contact area of the user's finger is relatively large with respect to the overall size of the TouchPad™. Additionally, the contact area varies in size and shape with the pressure applied by the user. Therefore, to provide an accurate measurement of the finger position, the device must determine some parameter such as the center of the contact area between the finger and the pad. Such determinations are, at best, of limited precision.

Similarly, a user can only move a TrackPoint™ a small distance. Hence, the displacement of the button cannot be mapped directly into a displacement in the cursor position on a display. Instead, the button displacement controls the direction and speed of the movement of the cursor. The accuracy with which a user can position the cursor with the TrackPoint™ button is significantly less than that achieved with a conventional mouse.

In previously filed U.S. patent application Ser. No. 10/723, 957 filed on Nov. 24, 2003, which is hereby incorporated by reference, an improved pointing device for handheld and portable devices is described. The pointing device utilizes a puck that moves in a defined field of motion when a user applies pressure to the puck via the user's finger. The pointing device uses a pressure sensor to sense two predetermined threshold levels. The first level is used to activate the tracking of a cursor on the display. The system changes to the track state when the amount of pressure applied to the puck exceeds the first threshold level. The second level is used to implement the "click" or select function associated with a conventional mouse. A "click" is recognized by the system when the amount of pressure applied to the puck exceeds the second threshold level.

These "touch" and "click" threshold levels require accurate calibrations in order to perform satisfactorily for a user. In practice, however, manual calibration of each individual pointing device during the manufacturing process may be difficult and impractical. Moreover, the threshold levels that are set by the manufacturer may be too sensitive for some users and not sufficiently sensitive for other users.

SUMMARY

In accordance with the invention, a method and system for automatic re-calculation and monitoring of thresholds in a puck-based pointing device are provided. A pointing device system includes a moveable puck, a first surface on which a puck field of motion is defined, a controller, and a pressure sensing mechanism. The lateral changes in puck positions are used to move a cursor on a display while the vertical changes in puck positions are used to perform a "click" or select function.

The pressure sensing mechanism measures an amount of pressure applied to the puck and the controller determines whether the measured amount of pressure meets a touch threshold value or a click threshold value. Initial touch and click threshold values are determined when a first positive gradient is detected in the measured amount of pressure. The touch threshold value is then re-calculated when the measured amount of pressure meets or exceeds the initial touch threshold value or a previous touch threshold value but does not meet the initial or previous click threshold value in one embodiment in accordance with the invention. The initial or previous click threshold value is re-calculated when the measured amount of pressure meets the initial or previous click threshold value in an embodiment in accordance with the invention.

Changes in a position of the puck or a review of previously measured pressure values or events may be analyzed prior to re-calculating the touch or click threshold values. The touch and click threshold values are monitored and if necessary re-calculated continuously in an embodiment in accordance with the invention. In another embodiment in accordance with the invention, the touch and click threshold values are monitored and if necessary re-calculated for a given period of time or for a given number of re-calculations.

DETAILED DESCRIPTION

The following description is presented to enable embodiments of the invention to be made and used, and is provided in the context of a patent application and its requirements. Various modifications to the disclosed embodiments will be readily apparent, and the generic principles herein may be applied to other embodiments. Thus, the invention is not intended to be limited to the embodiments shown but is to be accorded the widest scope consistent with the appended claims. Like reference numerals designate corresponding parts throughout the figures.

Figure 1A:
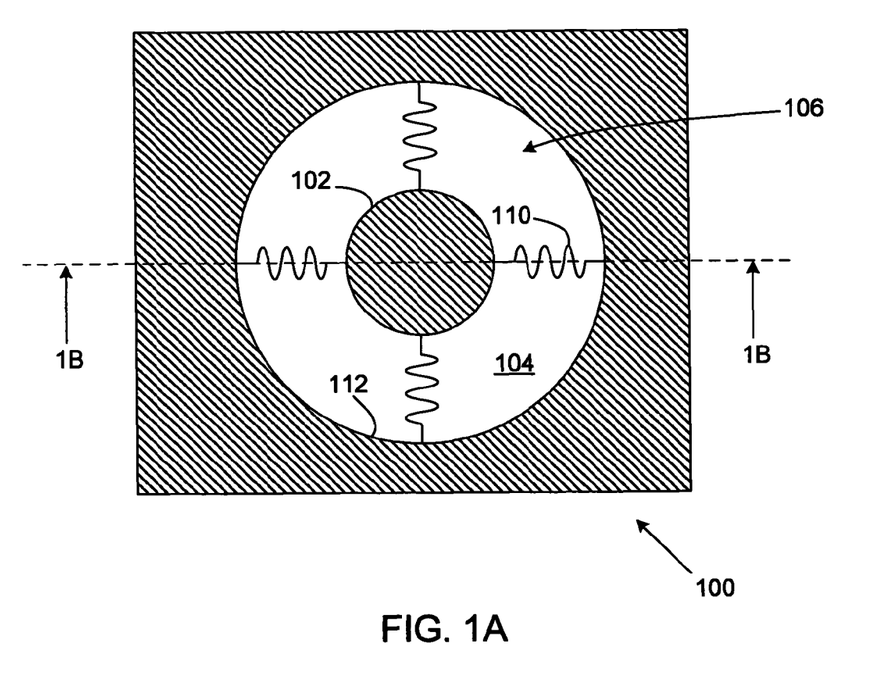
FIG. 1A illustrates a top view of a pointing device in an embodiment in accordance with the invention.

FIG. 1A illustrates a top view of a pointing device in an embodiment in accordance with the invention. Pointing device 100 includes puck 102 that moves over surface 104 within a puck field of motion 106 in response to a lateral force applied to puck 102. The force is typically applied to puck 102 by a user's finger, finger tip, thumb, thumb tip or multiple fingers (108 in FIG. 1B). Pointing device 100 includes a pressure sensing mechanism that measures the vertical pressure applied to puck 102 and a position sensing mechanism for determining the position of puck 102 within the puck field of motion 106 in an embodiment in accordance with the invention.

When a user applies a vertical force to puck 102 that is greater than one threshold value, referred to herein as a touch threshold value, any change in the position of puck 102 over surface 104 is reported to a host device (not shown). When a user applies a vertical force to puck 102 that is greater than another threshold value, referred to herein as a click threshold value, the user has performed a "clicking" operation that is reported to a host device (not shown). The automatic re-calculation and monitoring of the touch and click threshold values are described in more detail in conjunction with FIGS. 6-10.

When the user releases puck 102 by removing his or her finger (108 in FIG. 1B), puck 102 is returned to its centered position by springs 110 that connect puck 102 to edge plate 112. Since the user's finger is not applying a vertical force to puck 102 during its return to the center position, the change in motion is not reported to the host device. This provides a convenient "re-centering" capability typically achieved on a mouse by lifting and replacing the mouse to the center of the field of motion. This re-centering capability is useful with laptop computers, handheld devices and other miniature apparatus in which the field of motion is constrained.

Figure 1B:
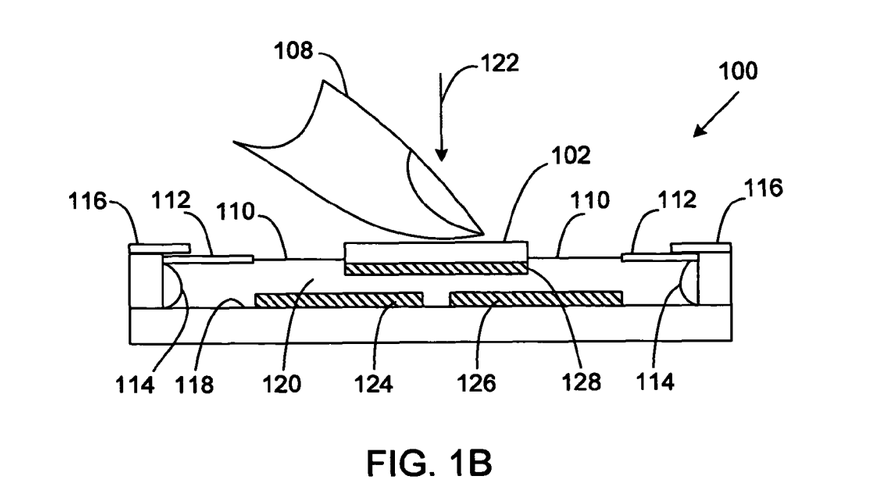
FIG. 1B depicts a cross-sectional view of the pointing device shown in FIG. 1A through line 1B-1B.

FIG. 1B depicts a cross-sectional view of the pointing device shown in FIG. 1A through line 1B-1B. Edge plate 112 has an opening that allows springs 110 to connect puck 102 to edge plate 112 and define the puck field of motion 106. Springs 110 return puck 102 to a predetermined location within the puck field of motion when puck 102 is released by the user. One example of a predetermined location within the puck field of motion is the center. Springs 114 maintain the position of edge plate 112 against detent 116.

Puck 102 moves toward the bottom 118 of cavity 120 when finger 108 applies a downward force to puck 102 in the direction shown by arrow 122. The vertical pressure applied to puck 102 and the position of puck 102 within the puck field of motion 106 can be sensed by any one of a number of methods. One such pressure sensing mechanism senses the capacitance between electrodes 124, 126 and puck electrode 128 to provide a measurement of the distance between puck 102 and bottom 118. The measured capacitance between electrodes 124, 126 and puck electrode 128 is also used to determine the position of puck 102 within the puck field of motion 106.

Figure 2:
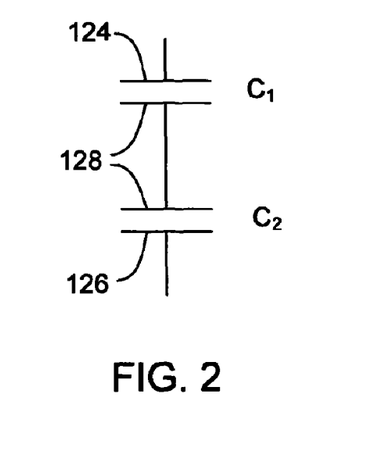
FIG. 2 illustrates an equivalent circuit formed by electrodes 124, 126, 128 shown in FIG. 1B.

FIG. 2 illustrates an equivalent circuit formed by electrodes 124, 126, 128 shown in FIG. 1B. Electrodes 124, 126, 128 form an electrical circuit that is equivalent to two capacitors connected in series with puck electrode 128 as the common electrode. Capacitor $C_1$ represents the capacitance between electrodes 124 and 128 while capacitor $C_2$ represents the capacitance between electrodes 126 and 128. The total capacitance between electrodes 124 and 126 depends on the distance between puck electrode 128 and electrodes 124, 126 and an amount of overlap between puck electrode 128 and electrodes 124, 126. This total capacitance can be sensed with the aid of external electrical connections to electrodes 124, 126, which have been omitted from FIG. 2 for the sake of simplicity. This capacitance measuring scheme does not require an external electrical connection to puck electrode 128, and therefore is inexpensive and simple in its implementation. However, other embodiments in accordance with the invention may measure the capacitance between puck electrode 128 and one or both of electrodes 124 and 126.

While the above-described pointing device embodiment utilizes capacitive measurements for sensing the distance between the moveable element and the bottom 118 of cavity 120 and the position of puck 102 within the puck field of motion 106, other embodiments in accordance with the invention can use different position and pressure sensing mechanisms. By way of example only, the position of puck 102 in the puck field of motion 106 can be ascertained using optical sensors such as those used in a conventional optical mouse.

Figure 3:
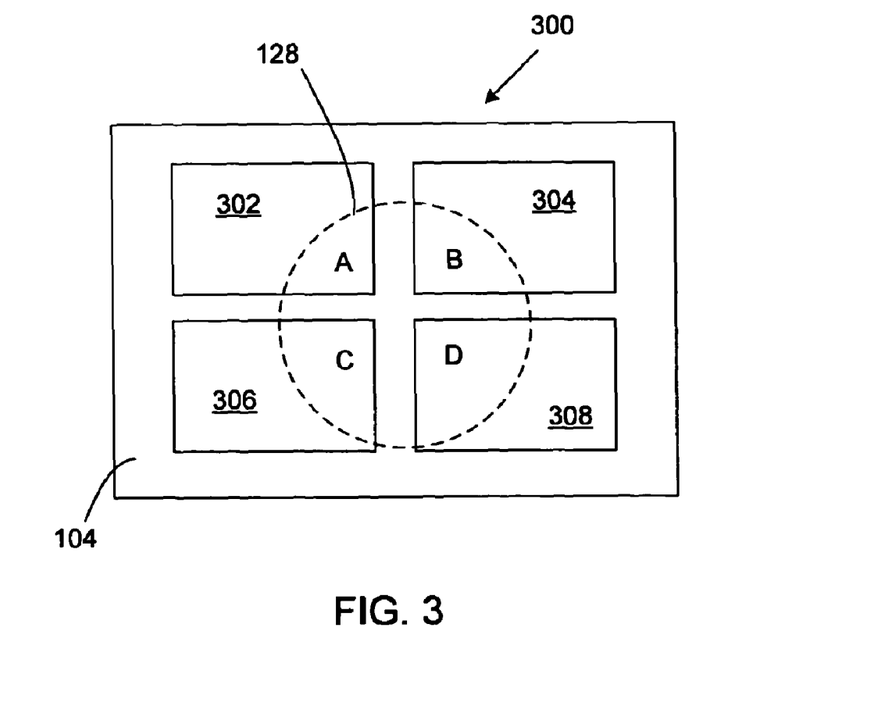
FIG. 3 depicts a top view of a portion of surface 104 shown in FIG. 1 over which a puck moves in an embodiment in accordance with the invention.

An embodiment of a position detector 300 that detects the position of a puck on an underlying surface may be more easily understood with reference to FIG. 3. FIG. 3 depicts a top view of a portion of surface 104 shown in FIG. 1 over which a puck moves in an embodiment in accordance with the invention. Underlying surface 104 includes four electrodes 302, 304, 306, 308 that have terminals (not shown) connected to an external circuit (not shown). Embodiments in accordance with the invention are not limited to the use of four electrodes 302, 304, 306, 308. Any given number of electrodes can be used.

Puck 102 has a bottom surface that includes puck electrode 128, which is shown in phantom in FIG. 3. Electrodes 302, 304, 306, 308 are electrically isolated from one another. For example, puck electrode 128 can be covered with a layer of dielectric material to provide the required insulation while still allowing puck electrode 128 to slide over electrodes 302, 304, 306, 308. Electrodes 302, 304, 306, 308 are patterned on underlying surface 300 in an embodiment in accordance with the invention. This reduces the capacitance between electrodes 302, 304, 306, 308 and puck electrode 128, but can be practical for a substrate thickness of a few millimeters or less. The overlap between puck electrode 128 and each of electrodes 302, 304, 306, 308 depends on the position of the puck relative to electrodes 302, 304, 306, 308. The overlaps between puck electrode 128 and electrodes 302, 304, 306, 308 are denoted in FIG. 3 by the letters A, B, C, D, respectively.

Figure 4:
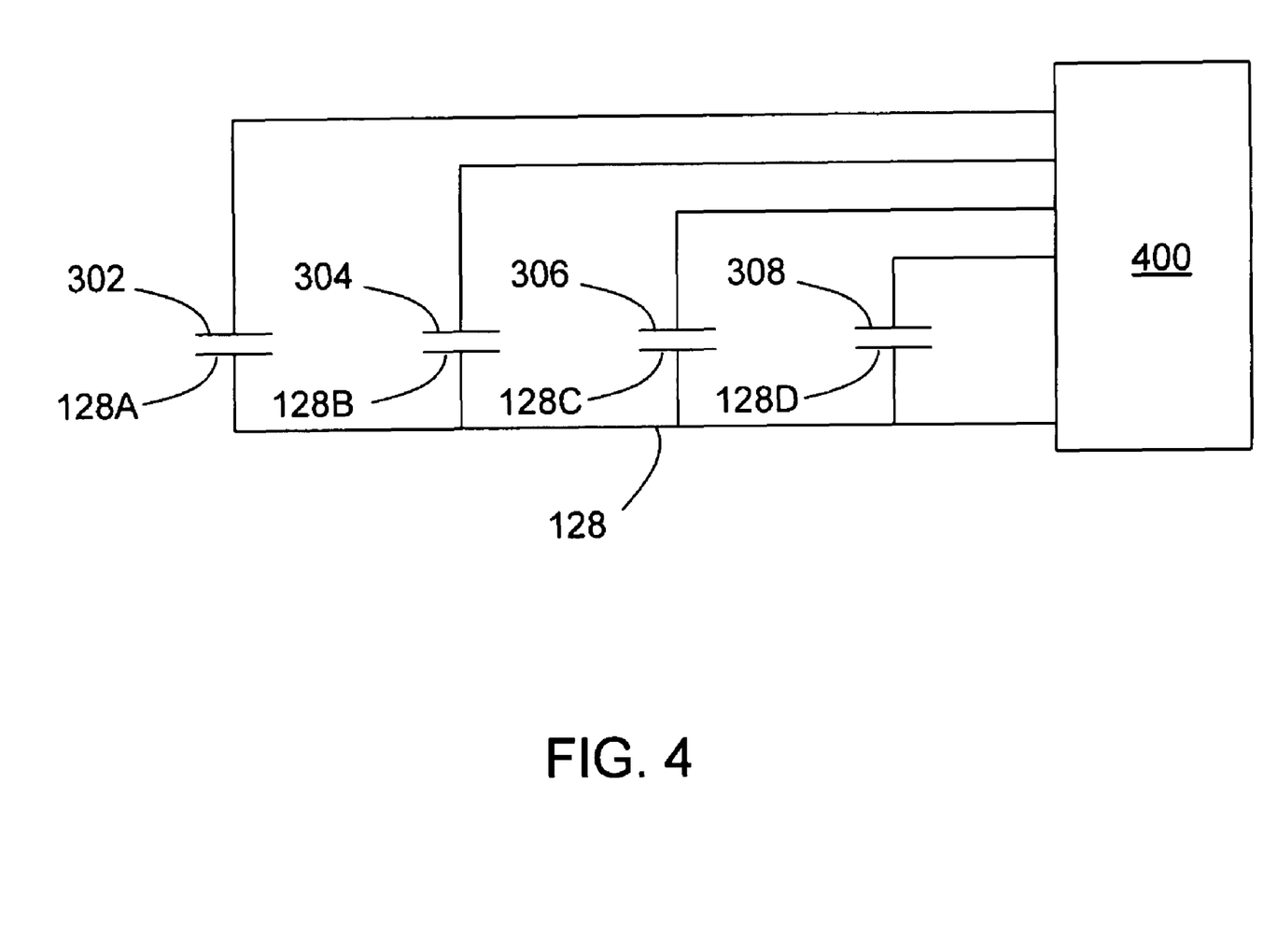
FIG. 4 illustrates a schematic drawing of an equivalent circuit for electrodes 302, 304, 306, 308 shown in FIG. 3.

Referring now to FIG. 4, there is shown a schematic drawing of an equivalent circuit for electrodes 302, 304, 306, 308 shown in FIG. 3. The portion of puck electrode 128 that overlaps electrode 302 forms a parallel plate capacitor that has a capacitance that is proportional to overlap A. Similarly, the portion of puck electrode 128 that overlaps electrode 304 forms a parallel plate capacitor that has a capacitance that is proportional to overlap B, and so on. Since all of the capacitors share portions of puck electrode 128 in FIG. 3, the equivalent circuit includes the four capacitors connected to common puck electrode 128.

The position of puck electrode 128 relative to electrodes 302, 304, 306, 308 is determined by measuring the capacitance between puck electrode 128 and each electrode 302, 304, 306, 308. This determination is made by controller 400 in an embodiment in accordance with the invention. Controller 400 may be included in a pointing device (e.g., 100 in FIG. 1) or may be included in a host device (not shown) that includes pointing device 100.

Figure 5:
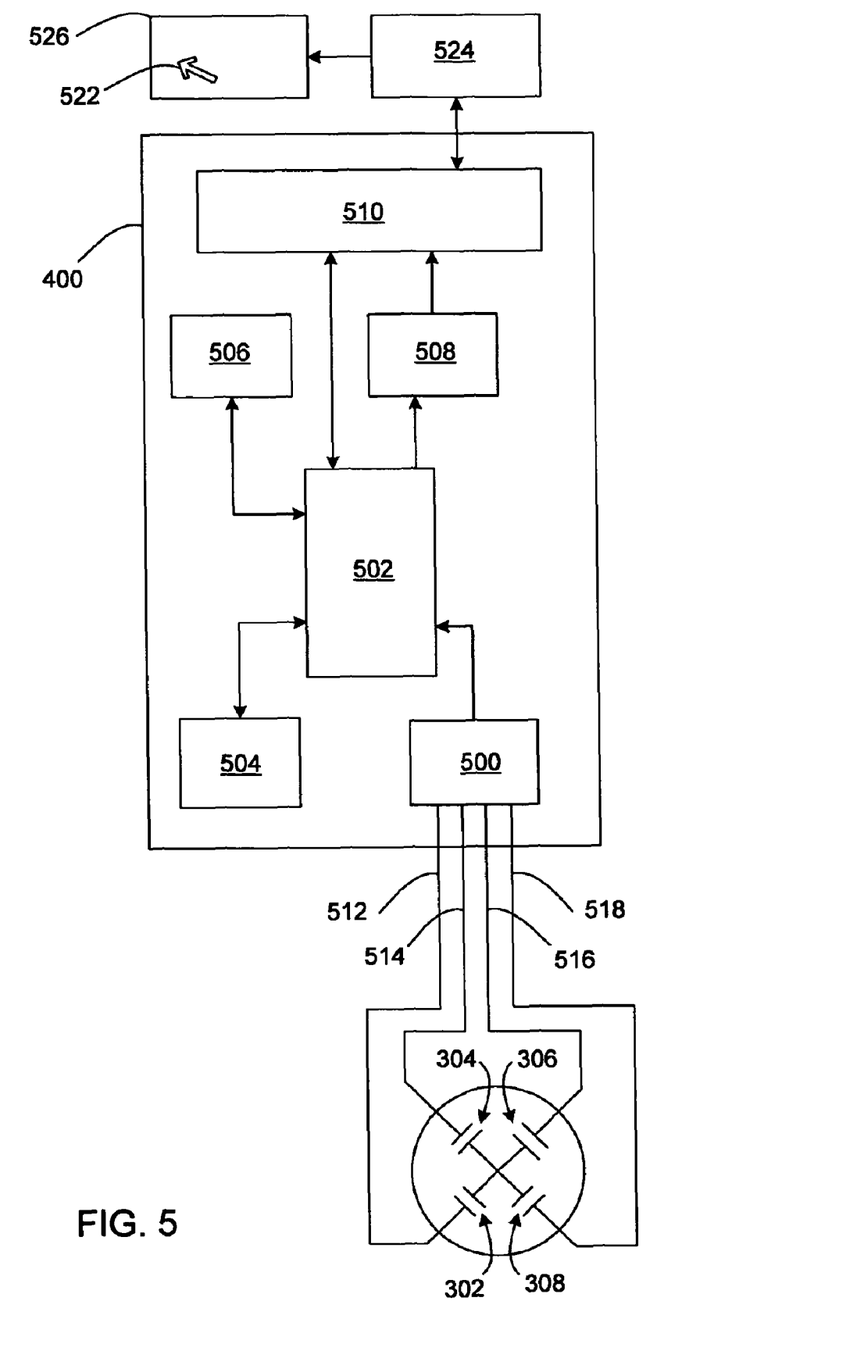
FIG. 5 depicts a block diagram of controller 400 shown in FIG. 4 in an embodiment in accordance with the invention.

FIG. 5 depicts a block diagram of controller 400 shown in FIG. 4 in an embodiment in accordance with the invention. Controller 400 includes analog interface 500, pointing device microprocessor 502, static memory 504, dynamic memory 506, motion buffer 508, and input/output component 510. A capacitance value for each electrode 302, 304, 306, 308 is received by analog interface 500 via input lines 512, 514, 516, 518, respectively. Analog interface 500 converts the capacitance measurements into representative digital values.

Pointing device microprocessor 502 receives the representative digital values and determines whether a user has touched the puck with a force that meets or exceeds at least one threshold. The total measured capacitance of electrodes 302, 304, 306, 308 is analyzed using firmware stored in static memory 504 to determine whether the pressure applied to puck 102 meets or exceeds a touch threshold or a click threshold. Increases or decreases in the total measured capacitance of electrodes 302, 304, 306, 308 are used to determine whether the puck is pressed in a downward direction.

Pointing device microprocessor 502 also determines the position of puck 102 within the puck field of motion using navigation firmware stored in static memory 504. The representative digital values relative to each other are analyzed to determine the position of puck 102.

The position of the puck can be stored in optional motion buffer 508 prior to being received by input/output component 510. Input/output component 510 transfers the position information to host microprocessor 524, which in turn changes the position of cursor 522 on host display 526 in response to receiving revised position information from controller 400.

Figure 6A:
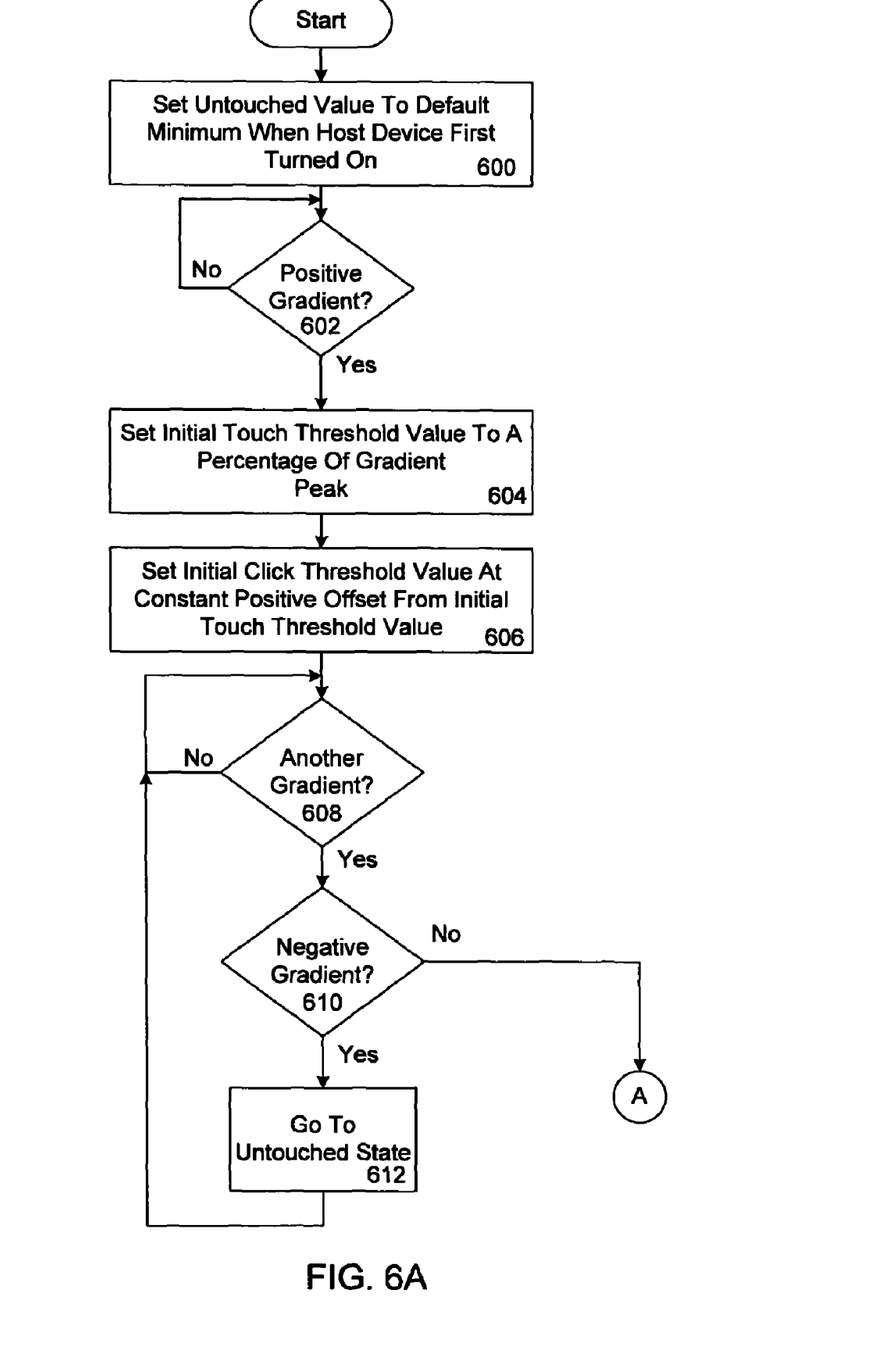
FIGS. 6A-6B illustrate a flowchart of a first method for automatic re-calculation and monitoring of thresholds in a puck-based pointing device in an embodiment in accordance with the invention.
Figure 6B:
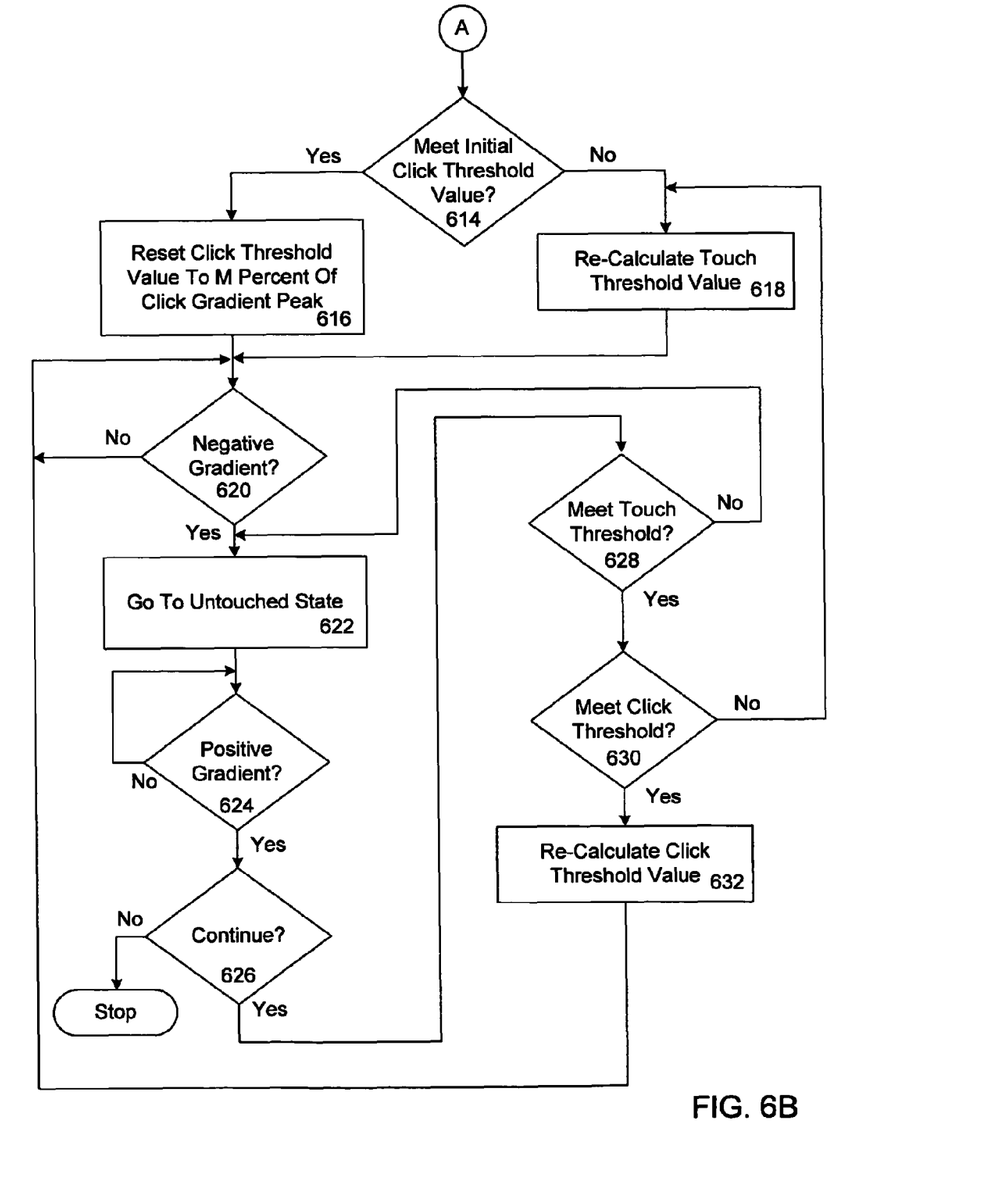

Referring now to FIGS. 6A-6B, there is shown a flowchart of a first method for automatic re-calculation and monitoring of thresholds in a puck-based pointing device in an embodiment in accordance with the invention. The embodiment shown in FIGS. 6A-6B may be more easily understood with reference to FIG. 8. FIG. 8 depicts a graph of measured capacitance over time that illustrates the first and second methods for automatic re-calculation of a puck-based pointing device shown in FIGS. 6A-6B and FIG. 7. Plot 800 in FIG. 8 represents the total capacitance sensed from the puck that exceeds the untouched value represented by point 806, plot 802 an adaptable touch threshold, and plot 804 an adaptable click threshold in an embodiment in accordance with the invention.

Initially, an "untouched" value is set to a default minimum when the host device is first turned on, as shown in block 600. The untouched value represents a state at which a user is not applying pressure to the puck. The default untouched value is determined by a manufacturer in an embodiment in accordance with the invention. The default untouched state is set at point 806 in the embodiment shown in FIG. 8.

A determination is then made at block 602 as to whether a user has touched the puck and introduced a positive gradient in the total measured capacitance. A gradient is a graded change in the magnitude of the total measured capacitance in the embodiment of FIG. 6. In FIG. 8, a gradient is reflected in the slope or the change in the measured capacitance over time of a line in plot 800.

If a positive gradient is not present, the method waits until a user touches the puck and produces a positive gradient. When a positive gradient is detected (see 808 in FIG. 8), an initial touch threshold value is then determined based on a percentage N of the gradient peak (block 604). The peak of the first gradient is located at point 810 in FIG. 8.

An initial touch threshold value is a percentage of that peak capacitance value in an embodiment in accordance with the invention. Other embodiments in accordance with the invention may use different techniques for determining the initial touch threshold value. For example, the initial touch threshold value may be determined by averaging the peak of the gradient and some fixed capacitance value, or the initial threshold value may be the capacitance value located in the middle of the gradient.

The percentage N can be any given percent value, and is set to seventy-five percent in an embodiment in accordance with the invention. The percentage N is set by a manufacturer in one embodiment in accordance with the invention. In another embodiment in accordance with the invention, the percentage N is programmable, thereby allowing a user to change the percentage at any given time.

An initial click threshold value is then set at a constant positive offset from the initial touch threshold, as shown in block 606. A capacitance value is added to the initial touch threshold value in an embodiment in accordance with the invention. For example, the initial click threshold value may be set to 1.5 times the initial touch threshold value. An initial click threshold value is located at point 812 in FIG. 8. Other embodiments in accordance with the invention can determine the initial click threshold value differently.

A determination is then made at block 608 as to whether another gradient is present. If not, the process waits until a gradient is present. When a gradient is present, a determination is made at block 610 as to whether the gradient is a negative gradient indicating the user has reduced the amount of pressure he or she is applying to the puck. For example, the user may have removed his or her finger from the puck.

If the gradient is negative (see 814 in FIG. 8), the method returns to the untouched state (block 612) and returns to block 608. When the gradient is positive (i.e., not negative) (see 816 in FIG. 8), the method passes to block 614 where a determination is made as to whether the capacitance value located at the peak of the gradient meets or exceeds the initial click threshold value. If so, the click threshold value is reset to a percentage M of the peak capacitance value for the gradient (block 616). The peak of the click positive gradient is located at point 818 in FIG. 8.

The percentage M can be any given percent value, and is set to seventy-five percent in accordance with the invention. The percentage M is set by a manufacturer in one embodiment in accordance with the invention. In another embodiment in accordance with the invention, the percentage M is programmable, thereby allowing a user to change the percentage at any given time.

If the capacitance value represented by the peak of the gradient does not meet the initial click threshold value (see block 614), the touch threshold value is re-calculated at block 618. Re-calculating the touch threshold value can be implemented in any one of a number of ways. For example, the touch threshold value is re-calculated by taking a percentage of the capacitance value represented by the peak of the gradient and averaging it with previous touch threshold values in an embodiment in accordance with the invention. Other embodiments in accordance with the invention can re-calculate the touch threshold value using a different mathematical equation.

The method then passes to block 620, where a determination is made as to whether a negative gradient is present, indicating the user has reduced the amount of pressure he or she is applying to the puck. If not, the process waits until a negative gradient is present. When a negative gradient is present, the method returns to the untouched state at block 622.

A determination is then made at block 624 as to whether a positive gradient is present in the measured capacitance. If not, the method waits until a positive gradient is present in the measured capacitance. When a positive gradient is present, a determination is made as to whether the re-calculations of the touch and click threshold values are to continue (block 626). The method continuously updates the touch and click threshold values in one embodiment in accordance with the invention. In another embodiment in accordance with the invention, the touch and click threshold values are re-calculated for a given amount of time or for a given number of re-calculations.

When the re-calculation of the touch and click threshold values is to continue, the method passes to block 628 where a determination is made as to whether the capacitance value measured at the peak of the positive gradient (see block 624) meets or exceeds the touch threshold value. If not, the process passes to block 622.

If the capacitance value does meet or exceed the touch threshold value, a determination is made as to whether the capacitance value meets or exceeds the click threshold value (block 630). If not, the method returns to block 618 where the touch threshold value is re-calculated. If the capacitance value represented by the peak of the gradient does meet or exceed the click threshold value, the click threshold value is re-calculated at block 632. Re-calculating the click threshold value can be implemented in any one of a number of ways. For example, the click threshold value is re-calculated by taking a percentage of the capacitance value represented at the peak of the click gradient and averaging it with previous click threshold values in an embodiment in accordance with the invention. The method then returns to block 620.

Figure 7:
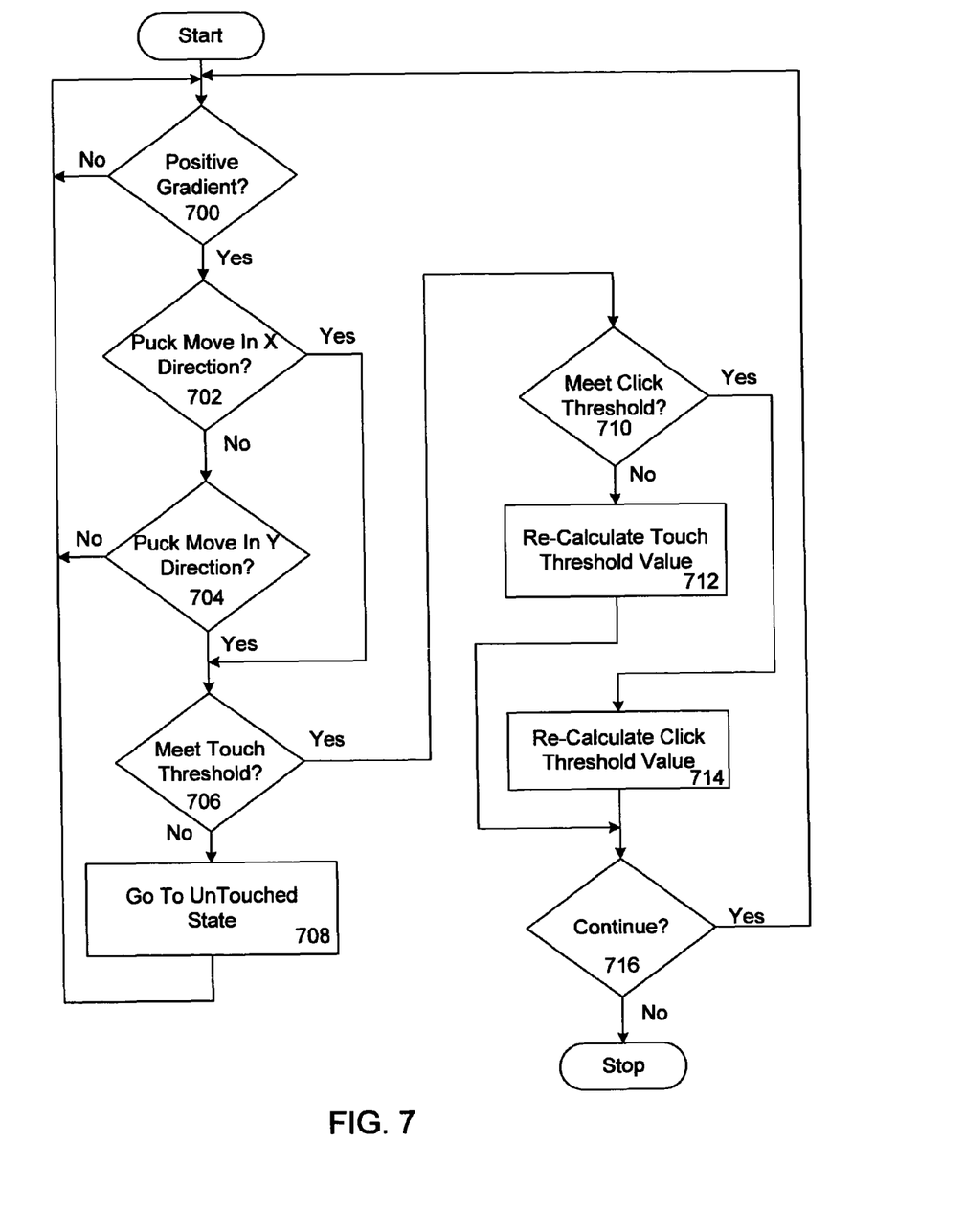
FIG. 7 illustrates a flowchart of a second method for automatic re-calculation and monitoring of thresholds in a puck-based pointing device in an embodiment in accordance with the invention.
Figure 8:
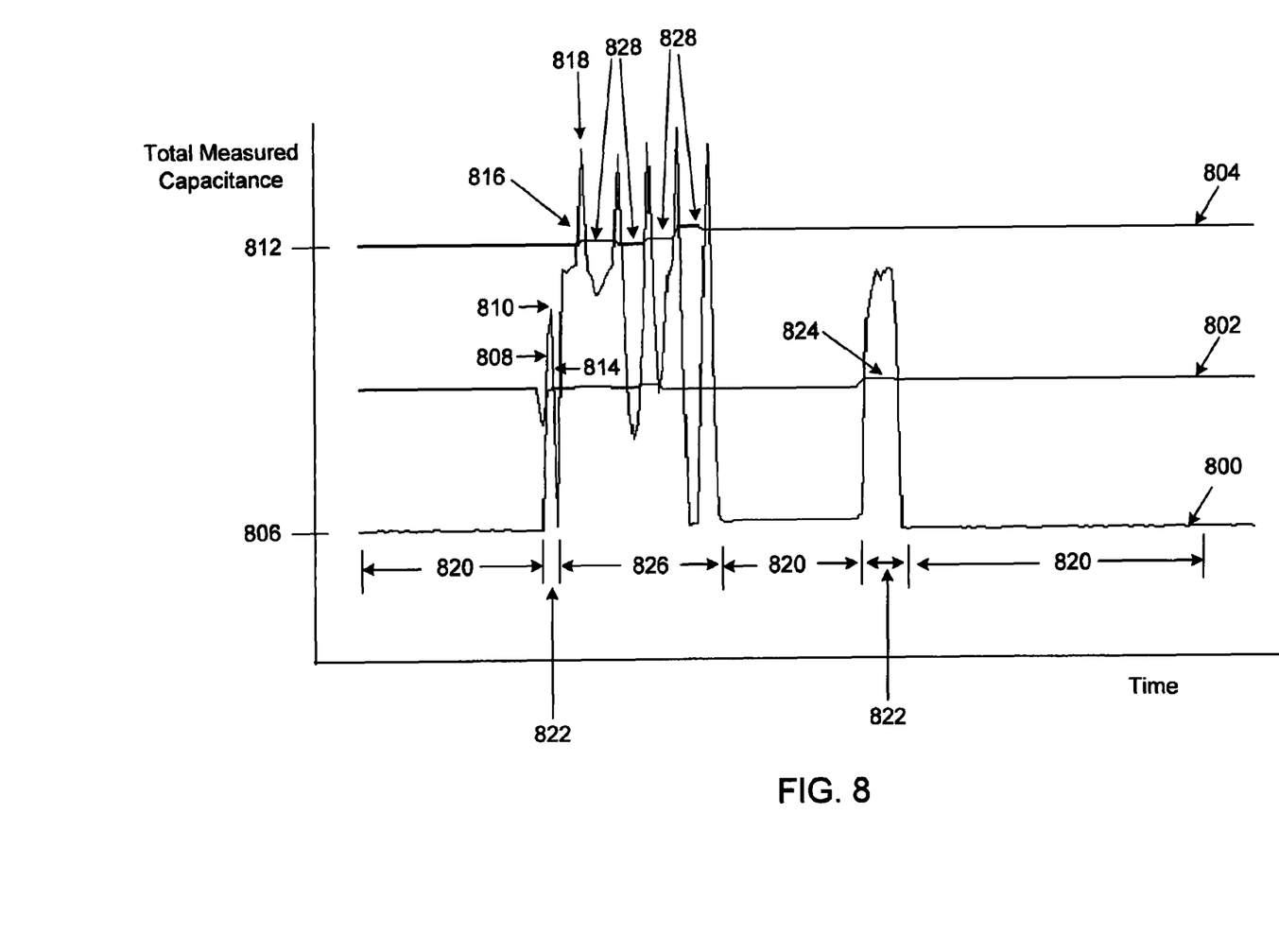
FIG. 8 depicts a graph of measured capacitance over time that illustrates the first and second methods for automatic re-calculation of a puck-based pointing device shown in FIGS. 6A-6B and FIG. 7.

Referring now to FIG. 7, there is shown a flowchart of a second method for automatic re-calculation and monitoring of thresholds in a puck-based pointing device in an embodiment in accordance with the invention. This method begins after the initial touch and initial click threshold values have been determined. Initially, a determination is made as to whether a positive gradient is present in the measured capacitance (700).

When a positive gradient is present, a determination is made at block 702 as to whether the position of the puck has moved in the x-direction. The position of the puck must move a pre-determined amount in the x-direction in one embodiment in accordance with the invention. If the puck has not moved in the x-direction, a determination is then made at block 704 as to whether the position of the puck has moved in the y-direction. The position of the puck must move a pre-determined amount in the y-direction in one embodiment in accordance with the invention. The x-direction and y-direction threshold values are set by a manufacturer in one embodiment in accordance with the invention. In another embodiment in accordance with the invention, the x-direction and y-direction threshold values are programmable, thereby allowing a user to change the threshold values at any given time.

If the position of the puck has not moved in the x and y directions, the method determines the puck is in the untouched state and does not re-calculate either one of the initial click and touch threshold values. If the position of the puck does move in the x-direction or in the y-direction, the method passes to block 706 where a determination is made as to whether the measured capacitance value at the peak of the positive gradient meets or exceeds the initial touch threshold value. If so, a determination is made as to whether the capacitance value at the peak of the positive gradient meets or exceeds the initial click threshold value.

When the capacitance value does not meet or exceed the click threshold value, the touch threshold value is re-calculated at block 712. Alternatively, the click threshold value is re-calculated (block 714) when the capacitance value does meet or exceed the click threshold value. A determination is then made at block 716 as to whether the re-calculations of the touch and click threshold values are to continue. If so, the method returns to block 700.

The method shown in FIG. 7 includes the use of a change in puck position to confirm a user is intentionally applying pressure to the puck. This provides a confirmation step that avoids accidental misinterpretations of puck pressure. For example, a user may set an object on top of the pointing device or put the host device in a pocket or some other enclosed space that causes pressure to be applied to the puck. Misinterpretations in puck pressure are reduced or eliminated by determining whether the puck has moved in position, and in particular moved beyond one or more threshold values.

As discussed earlier, FIG. 8 depicts a graph of measured capacitance over time that illustrates the first and second methods for automatic re-calculation and monitoring of thresholds in a puck-based pointing device shown in FIGS. 6A-6B and FIG. 7. Regions 820 represents time periods when the user did not touch the puck or did not apply a sufficient amount of pressure to the puck to meet the touch threshold. Regions 822 reflect times when the user touched the puck and applied a sufficient amount of force such that the measured capacitance value met or exceeded the touch threshold value. This caused the touch threshold value to be re-calculated, as indicated by the changes 824 in plot 802. And region 826 reflects a time period when the user performed the clicking function five times in a row. The click threshold value was re-calculated each time the measured capacitance value met or exceeded the click threshold value, as indicated by the changes 828 in plot 804.

Figure 9:
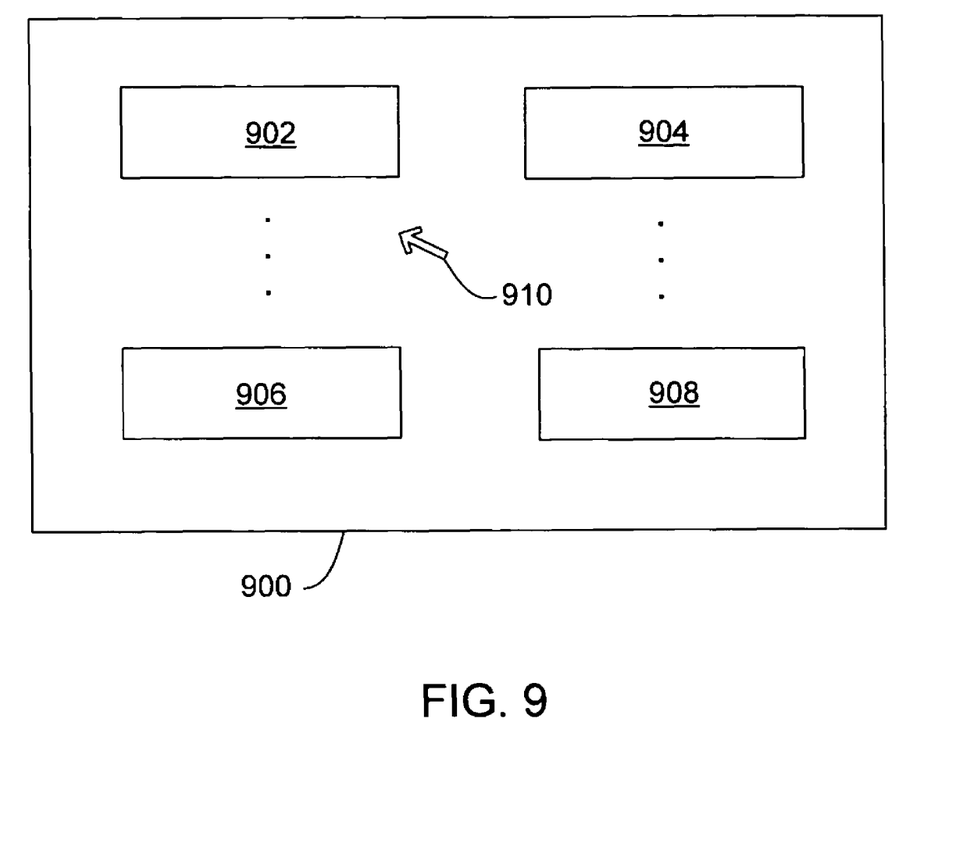
FIG. 9 depicts a user interface that can be used to program various parameters used in the re-calculation methods shown in FIGS. 6A-6B and FIG. 7.

FIG. 9 depicts a user interface that can be used to program various parameters used in the re-calculation methods shown in FIGS. 6A-6B and FIG. 7. Host display 900 displays boxes 902, 904, 906, 908. The ellipses indicate any given number of boxes may be shown on display 900. Boxes 902, 904, 906, 908 may be implemented as any type of data entry interface. For example, boxes 902, 904, 906, 908 may be implemented as pull-down menus or dialog boxes in an embodiment in accordance with the invention. Boxes 902, 904, 906, 908 can be used to program any given parameter used in a re-calculation method. By way of example only, box 902 may be used to program the touch threshold, box 904 the click threshold, box 906 the x-direction and y-direction thresholds, and box 908 the number of times the re-calculation method should occur (e.g., continuously, for a given time period, or for a given number of re-calculations). A user can select or enter the parameter values using cursor 910.

Figure 10:
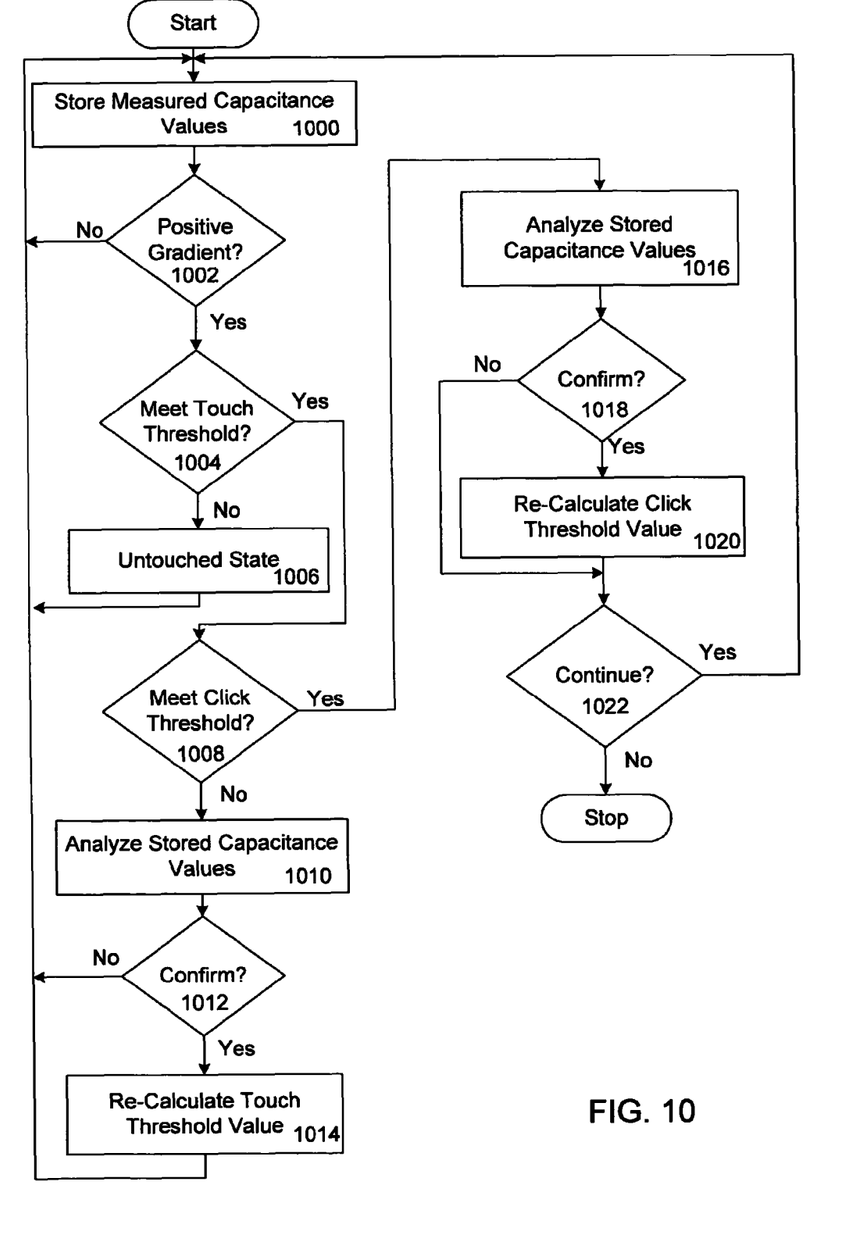
FIG. 10 illustrates a flowchart of a third method for automatic re-calculation and monitoring of thresholds in a puck-based pointing device in an embodiment in accordance with the invention.

Referring now to FIG. 10, there is shown a third flowchart of a method for automatic re-calculation and monitoring of thresholds in a puck-based pointing device in an embodiment in accordance with the invention. This method begins after the initial touch and initial click threshold values have been determined and the system is in an untouched state in an embodiment in accordance with the invention. Initially, the measured capacitance values are stored in memory, as shown in block 1000.

A determination is then made at block 1002 as to whether a positive gradient is present in the measured capacitance values. When a positive gradient is present, a determination is made at block 1004 as to whether the measured capacitance value at the peak of the positive gradient meets or exceeds the current touch threshold value. If not, the state of the puck remains in the untouched state, as shown block 1006.

If the measured capacitance value does meet or exceed the current touch threshold value, a determination is then made as to whether the capacitance value at the peak of the positive gradient meets or exceeds the current click threshold value (block 1008). When the capacitance value does not meet the current click threshold value, the stored capacitance values are analyzed (block 1010) to review a history of past values or events to confirm the touch threshold value is to be re-calculated. For example, if the stored capacitance values show a previous positive gradient that met the click threshold value, a subsequent untouched state, and then the current positive gradient that meets the touch threshold level, the need to re-calculate the touch threshold is confirmed.

A determination is then made at block 1012 as to whether the need to re-calculate the touch threshold value is confirmed. If not, the method returns to block 1000. Alternately, the touch threshold value is re-calculated at block 1014 when the need to re-calculate the touch threshold value is confirmed.

Returning to block 1008, when the capacitance value does meet or exceed the current click threshold value, the stored capacitance values are analyzed (block 1016) to review past values or events and confirm the click threshold value is to be re-calculated. A determination is then made at block 1018 as to whether the need to re-calculate the click threshold value is confirmed. If so, the click threshold value is re-calculated at block 1020. If the need to re-calculate the click threshold value is not confirmed at block 1018, the method passes to block 1022 where a determination is made as to whether the method is to continue. If so, the method returns to block 1000.

The method shown in FIG. 10 includes the monitoring of the measured capacitance values or events in an embodiment in accordance with the invention. Monitoring of the measured capacitance values and gradient events assists the system in determining what has happened. For example, monitoring of the measured capacitance values and gradient events can help eliminate impossible state transitions that might otherwise erroneously be reported through thresholds alone.

The invention claimed is:

1. A system for automatically re-calculating a first threshold value and a second threshold value in a puck-based pointing device, the system comprising:
    a first surface having a puck field of motion defined thereon;
    a moveable puck operable to move within the puck field of motion;
    a pressure sensing mechanism operable to measure an amount of pressure applied to the puck; and
    a controller operable to determine whether the measured amount of pressure at least meets the first threshold value and not the second threshold value and if so the first threshold value is changed and operable to determine whether the measured amount of pressure at least meets the second threshold value and if so the second threshold value is changed.

2. The system of claim 1, wherein the moveable puck comprises a puck electrode on a second surface on the puck that is parallel to the first surface, wherein the first surface comprises a plurality of electrodes that are parallel to the puck electrode and the puck electrode overlies a portion of each of the plurality of electrodes.

3. The system of claim 2, wherein the pressure sensing mechanism is operable to measure the amount of pressure applied to the puck by receiving a plurality of values each representing a measured capacitance between the puck electrode and a respective electrode of the plurality of electrodes.

4. The system of claim 1, further comprising a memory operable to store the first and second threshold values.

5. The system of claim 1, wherein the memory is operable to store current and previous measured pressure values.

6. The system of claim 1, wherein the controller re-calculates the first threshold value by computing a mathematical equation using at least a currently measured amount of pressure.

7. The system of claim 1, wherein the controller re-calculates the second threshold value by computing a mathematical equation using at least a currently measured amount of pressure.

8. A method for automatic re-calculation of a first threshold value and a second threshold value in a puck-based pointing device, the method comprising:
    measuring an amount of pressure applied to the puck;
    detecting a positive gradient in the measured amount of pressure;
    determining whether a peak pressure value in the positive gradient at least meets the first threshold value;
    determining whether the peak pressure value in the positive gradient at least meets the second threshold value when the peak pressure value at least meets the first threshold value;
    changing the first threshold value when the peak pressure value at least meets the first threshold value but does not meet the second threshold value; and
    changing the second threshold value when the peak pressure value at least meets the second threshold value.

9. The method of claim 8, further comprising:
    determining an initial first threshold value based on a peak pressure value in a first positive gradient; and
    determining an initial second threshold value based on the initial first threshold value.

10. The method of claim 9, wherein determining an initial first threshold value based on a peak pressure value in a first positive gradient comprises calculating a percentage of a peak pressure value of a first positive gradient to determine the initial first threshold value.

11. The method of claim 10, wherein determining an initial second threshold value based on the initial first threshold value comprises increasing the initial first threshold value by a constant value to determine the initial second threshold value.

12. The method of claim 8, further comprising:

storing a plurality of measured pressure values;

analyzing at least a portion of the plurality of measured pressure values prior to re-calculating the first threshold value; and analyzing at least a portion of the plurality of measured pressure values prior to re-calculating the second threshold value.

13. The method of claim 8, wherein changing the first threshold value when the peak pressure value at least meets the first threshold value but does not meet the second threshold value comprises computing a first mathematical equation using at least a currently measured amount of pressure.

14. The method of claim 8, wherein changing the second threshold value when the peak pressure value at least meets the second threshold value comprises computing a second mathematical equation using at least a currently measured amount of pressure.

15. The method of claim 8, wherein the method for automatic re-calculation of a first threshold value and a second threshold value in a puck-based pointing device repeats for a given period of time.

16. The method of claim 8, wherein the method for automatic re-calculation of a first threshold value and a second threshold value in a puck-based pointing device repeats continuously.

17. The method of claim 8, further comprising determining whether a position of the puck has moved in a first direction after the positive gradient in the measured amount of pressure is determined and prior to re-calculating either the first or second threshold values.

18. The method of claim 8, further comprising determining whether a position of the puck has moved in a second direction after the positive gradient in the measured amount of pressure is determined and prior to re-calculating either the first or second threshold values.

19. The method of claim 8, further comprising receiving the first and second threshold values.

20. The method of claim 19, wherein receiving the first and second threshold values comprises receiving user-input first and second threshold values.

* * * * *